(12) United States Patent
Wagner et al.

(10) Patent No.: US 11,893,469 B2
(45) Date of Patent: Feb. 6, 2024

(54) POSITION MASKING FOR TRANSFORMER MODELS

(71) Applicant: Microsoft Technology Licensing, LLC, Redmond, WA (US)

(72) Inventors: Andy Wagner, Cupertino, CA (US); Tiyasa Mitra, San Jose, CA (US); Marc Tremblay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 628 days.

(21) Appl. No.: 16/882,036

(22) Filed: May 22, 2020

(65) Prior Publication Data
US 2021/0365723 A1    Nov. 25, 2021

(51) Int. Cl.
| | | |
|---|---|---|
| *G06F 17/00* | (2019.01) | |
| *G06N 3/02* | (2006.01) | |
| *G06N 20/00* | (2019.01) | |
| *G06F 7/24* | (2006.01) | |
| *G06F 17/18* | (2006.01) | |
| *G06N 3/084* | (2023.01) | |
| *G06F 18/211* | (2023.01) | |
| *G06F 18/214* | (2023.01) | |

(52) U.S. Cl.
CPC .............. *G06N 3/02* (2013.01); *G06F 7/24* (2013.01); *G06F 17/18* (2013.01); *G06F 18/211* (2023.01); *G06F 18/214* (2023.01); *G06N 3/084* (2013.01); *G06N 20/00* (2019.01)

(58) Field of Classification Search
CPC ...... G06F 16/353; G06F 40/30; G06F 18/211; G06F 18/214; G06F 7/24; G06F 17/18; G06F 40/205; G06N 20/00; G06N 5/04; G06N 3/02; G06N 3/084; G06N 3/08; G06N 3/045
USPC ........................................................... 706/12
See application file for complete search history.

(56) References Cited

U.S. PATENT DOCUMENTS 6,470,306 B1 * 10/2002 Pringle ................. G06F 40/169
                                                    715/236
8,892,422 B1 * 11/2014 Kumar .................. G06F 40/284
                                                    704/10

(Continued)

OTHER PUBLICATIONS

Devlin, et al., "BERT: Pre-training of Deep Bidirectional Transformers for Language Understanding", In Repository of arXiv: 1810.04805v1, Oct. 11, 2018, 14 Pages.

(Continued)

*Primary Examiner* — Jason T Edwards
(74) *Attorney, Agent, or Firm* — Fountainhead Law Group PC

(57) ABSTRACT

Embodiments of the present disclosure include systems and methods for training transformer models using position masking. In some embodiments, a set of data for training a transformer model is received. The set of data includes a sequence of tokens and a set of position values. Each position value in the set of position values represents a position of a token in the sequence of tokens relative to other tokens in the sequence of tokens. A subset of the set of position values in the set of data is selected. Each position value in the subset of the set of position values is replaced with a second defined value to form a second set of defined values. The transformer model is trained using the set of data.

20 Claims, 10 Drawing Sheets

(56) References Cited

U.S. PATENT DOCUMENTS

| | | | | |
|---|---|---|---|---|
| 2015/0019662 | A1* | 1/2015 | O'Kane | G06Q 30/0241 |
| | | | | 709/206 |
| 2015/0325235 | A1* | 11/2015 | Levit | G06F 40/216 |
| | | | | 704/257 |
| 2016/0117954 | A1* | 4/2016 | Dumchev | G06F 40/30 |
| | | | | 434/157 |
| 2020/0311473 | A1* | 10/2020 | Agarwal | G06K 9/6256 |
| 2021/0034335 | A1* | 2/2021 | Svyatkovskiy | G06N 20/00 |

OTHER PUBLICATIONS

"International Search Report and Written Opinion Issued in PCT Application No. PCT/US21/028267", dated Sep. 23, 2021, 13 Pages.

Shaw, et al., "Self-Attention with Relative Position Representations", In Repository of arXiv:1803.02155v2, Apr. 12, 2018, 5 Pages.

Vaswani, et al., "Attention Is All You Need", In Repository of arXiv:1706.03762v1, Jun. 12, 2017, 15 Pages.

Wagner, et al., "Positional Masking for Language Models", In Repository of arXiv:2006.05676v1, Jun. 2, 2020, 7 Pages.

Wei, et al., "NEZHA: Neural Contextualized Representation for Chinese Language Understanding", In Repository of arXiv:1909.00204v1, Aug. 31, 2019, 7 Pages.

* cited by examiner

| TOKENS 305 | STRT | To | Be | Or | Not | To | Be | SEP | That | Is | The | Question | SEP |
|---|---|---|---|---|---|---|---|---|---|---|---|---|---|
| POSITION VALUES 310 | 0 | 1 | 2 | 3 | 4 | 5 | 6 | 7 | 8 | 9 | 10 | 11 | 12 |
| SENTENCE VALUES 315 | 0 | 0 | 0 | 0 | 0 | 0 | 0 | 0 | 1 | 1 | 1 | 1 | 1 |

| TOKENS 305 | STRT | To | Be | MASK | Not | To | Be | SEP | That | Is | The | MASK | SEP |
|---|---|---|---|---|---|---|---|---|---|---|---|---|---|
| POSITION VALUES 310 | 0 | 1 | 2 | 3 | 4 | 5 | 6 | 7 | 8 | 9 | 10 | 11 | 12 |
| SENTENCE VALUES 315 | 0 | 0 | 0 | 0 | 0 | 0 | 0 | 0 | 1 | 1 | 1 | 1 | 1 |
| TOKEN LABELS 405 | | | | Or | | | | | | | | Question | |

FIG. 4

| TOKENS 305 | STRT | To | Be | MASK | Not | To | Be | SEP | That | Is | The | MASK | SEP |
|---|---|---|---|---|---|---|---|---|---|---|---|---|---|
| POSITION VALUES 310 | 0 | 1 | MASK | 3 | 4 | 5 | 6 | 7 | 8 | 9 | MASK | 11 | 12 |
| SENTENCE VALUES 315 | 0 | 0 | 0 | 0 | 0 | 0 | 0 | 0 | 1 | 1 | 1 | 1 | 1 |
| TOKEN LABELS 405 | | | | Or | | | | | | | | Question | |
| POSITION LABELS 505 | | | 2 | | | | | | | | 10 | | |

FIG. 5

| Tokens 305 | MASK | MASK | Be | The | STRT | To | Not | To | Be | SEP | That | Is | SEP |
|---|---|---|---|---|---|---|---|---|---|---|---|---|---|
| Position Values 310 | 3 | 11 | MASK | MASK | 0 | 1 | 4 | 5 | 6 | 7 | 8 | 9 | 12 |
| Sentence Values 315 | 0 | 1 | 0 | 1 | 0 | 0 | 0 | 0 | 0 | 0 | 1 | 1 | 1 |
| Token Labels 405 | Or | Question | | | | | | | | | | | |
| Position Labels 505 | | | 2 | 10 | | | | | | | | | |

FIG. 6

POSITION MASKING FOR TRANSFORMER MODELS

BACKGROUND

The present disclosure relates to a computing system. More particularly, the present disclosure relates to techniques for training a neural network.

Natural-language understanding (NLU) is a subfield of natural-language processing (NLP) in artificial intelligence that addresses comprehension by computers of the structure and meaning of human language. NLU enables voice technology, search engines, and machine translation to deduce what a user means, regardless of the way it is expressed A neural network is a machine learning model that underpins NLU applications. A neural network is trained for a particular purpose by running datasets through it, comparing results from the neural network to known results, and updating the network based on the differences.

BRIEF DESCRIPTION OF THE DRAWINGS

Various embodiments of the present disclosure are illustrated by way of example and not limitation in the figures of the accompanying drawings.

FIG. 3 illustrates an example input data according to some embodiments.

FIG. 4 illustrates the input data illustrated in FIG. 3 with some tokens masked according to another embodiment.

FIG. 5 illustrates the input data illustrated in FIG. 4 with some position values masked according to some embodiments.

FIG. 6 illustrates the input data illustrated in FIG. 5 with masked data grouped and rearranged according to some embodiments.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for training transformer models using position masking. In some embodiments, a system receives a set of input data that includes a sequence (e.g., a set of sentences) of tokens (e.g., words) and position values for each token in the sequence of tokens. In some embodiments, a position value represents the relative position of a particular token in a sequence of tokens. The system may select a few tokens in the sequence and mask the selected tokens. In addition, the system can select a few position values and mask the selected position values. The system trains a transformer model using the masked input data. For each masked token, the transformer model outputs candidate tokens and, for each candidate token, a probability that the candidate token is the masked token. Additionally, for each masked position value, the transformer model outputs candidate position values and, for each candidate position value, a probability that the candidate position value is the masked position value. The system determines the candidate token with the highest probability as being the masked token. Similarly, the system determines the candidate position value with the highest probability as being the masked position value. Next, the system determines the differences between the determined candidate tokens and the actual tokens that were masked and uses the differences to adjust weights in the transformer model. Likewise, the system determines the differences between the determined candidate position values and the actual position values that were masked and uses the differences to adjust weights in the transformer model. In this manner, the transformer model can better predict masked tokens and masked position values in subsequently processed input data.

The techniques described in the present application provide a number of benefits and advantages over conventional methods of training a transformer model. For instance, masking position values in input data and using the input data to train the transformer model can increase the speed at which weights of the transformer model reach convergence. In other words, using such a technique results in faster training of the transformer model.

Figure 1:
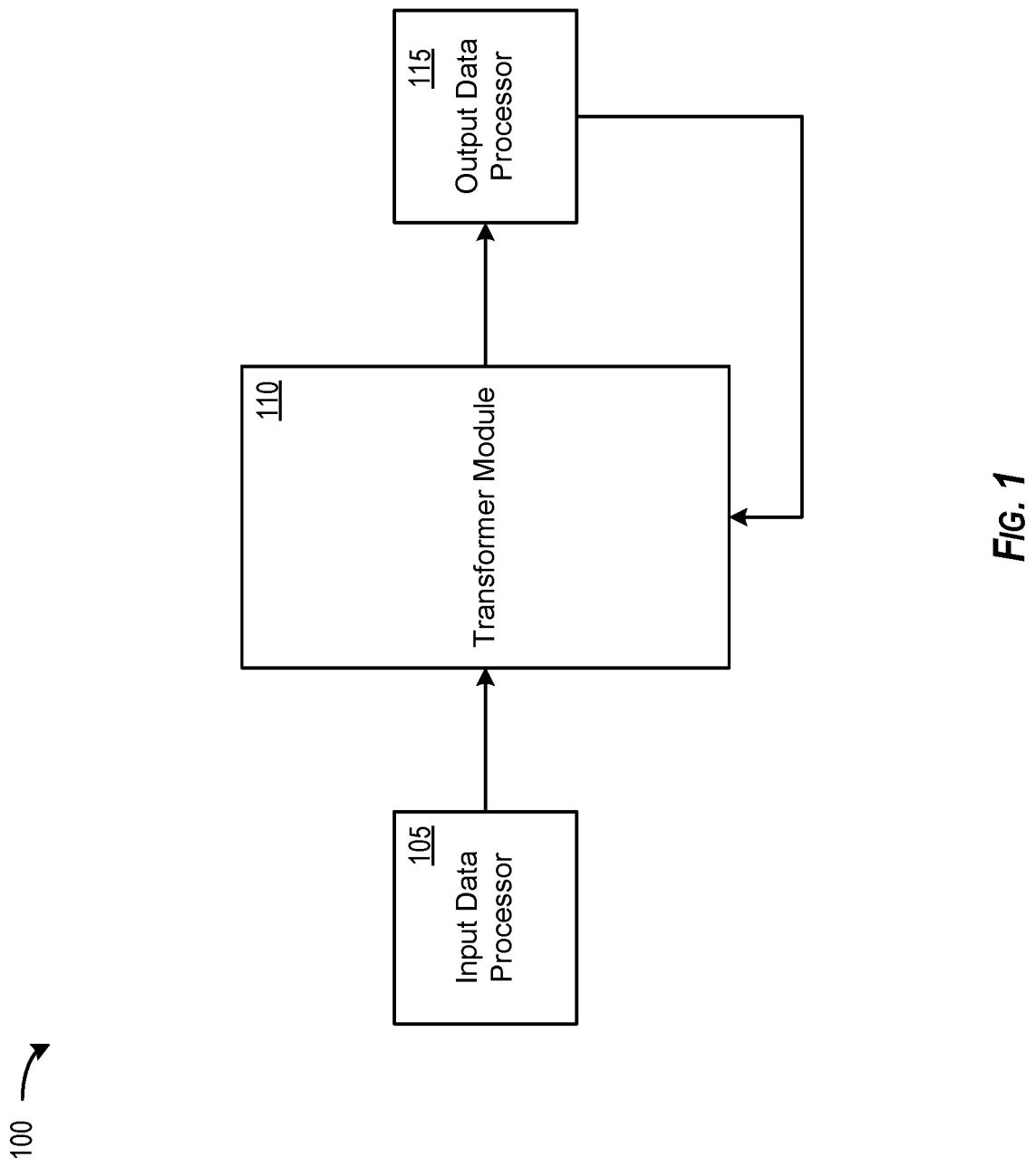
FIG. 1 illustrates a system for training a transformer model according to some embodiments.

FIG. 1 illustrates a system 100 for training a transformer model according to some embodiments. As shown, system 100 includes input data processor 105, transformer module 110, and output data processor 115. Input data processor 105 is configured to processor input data used for training transformer module 110. For example, input data processor 105 may receive a set of input data that includes a sequence (e.g., a set of sentences) of tokens (e.g., words) and position values for the sequence of tokens. As mentioned above, a position value represents the relative position of a particular token in a sequence of tokens. In some cases, a set of input data can also include a set of sentence values. In some embodiments, a sentence value represents a sentence to which a token in the sequence of tokens belongs.

Next, input data processor 105 can select a defined number of tokens in the sequence of tokens or a defined portion of the sequence of tokens (e.g., a percentage of the total number tokens in the sequence). In some embodiments, input data processor 105 selects tokens in the sequence randomly. Input data processor 105 then replaces the selected tokens with a defined token value. The selection and replacement of tokens may also referred to as token masking. Then, input data processor 105 may select a defined number of position values in the set of position values or a defined portion of the set of position values (e.g., a percentage of the total number position values in the set of position values). In some embodiments, input data processor 105 selects position values in the set of position values randomly. In some embodiments, the defined number or portion used for selecting tokens may be different than the defined number or portion used for selecting position values. Input data processor 105 then replaces the selected position values with a defined position value. The selection and replacement of position values may also referred to as position masking or position value masking.

After masking tokens and position values in the input data, input data processor 105 may determine token embeddings for each unmasked token in the sequence of tokens using an embedding space generated from a corpus of tokens (e.g., a vocabulary of words). In some embodiments, a token embedding space maps tokens in the corpus, which has many dimension, to numeric representations (e.g., vectors) having a lower number of dimensions. Then, input data processor 105 can determine position embeddings for each unmasked position value in the set of position values using an embedding space generated from a corpus of position values. In some embodiments, a position value embedding space maps position values in the corpus, which has many dimension, to numeric representations (e.g., vectors) having a lower number of dimensions. In cases where the input data includes sentence values, input data processor 105 may determine sentence embeddings for each sentence value in the set of sentence values using an embedding space generated from a corpus of sentence values. In some embodiments, a sentence value embedding space maps sentence values in the corpus, which has many dimension, to numeric representations (e.g., vectors) having a lower number of dimensions. After determining embeddings for tokens, position values, and/or sentence values, input data processor 105 calculates an aggregate embedding for each token in the sequence of tokens by adding the token embedding, the corresponding position value embedding, and/or the corresponding sentence value embedding together. Finally, input data processor 105 sends the aggregate embeddings to transformer module 110 for training.

Transformer module 110 is responsible for predicting masked tokens and masked position values given input data that includes unmasked tokens, masked tokens, unmasked position values, and masked position values. In some embodiments, transformer module 110 is implemented by a transformer neural network (also referred to as a transformer or a transformer model). In some such embodiments, a transformer neural network has a sequence-to-sequence architecture. That is, the transformer neural network can transforms a given sequence of elements, such as the sequence of words in a sentence, into another sequence. In some embodiments, the transformer neural network includes weights used for predicting masked tokens and masked positions. The transformer neural network can adjust these weights based on feedback (e.g., differences between predicted tokens for masked tokens and actual values of masked tokens, differences between predicted position values for masked position values and actual values of masked position values, etc.) received from output data processor 115 using a back propagation technique.

Transformer module 110 may determine relationships/correlations between tokens in input data. For instance, transformer module 110 can process tokens in relation to all the other tokens in a sequence, instead of one-by-one in order. In other words, transformer module 110 considers the full context of a token by looking at the tokens that come before and after it. Transformer module 110 may be used for machine translation and search (e.g., conversational queries). Other applications of transformer module 110 include: document summarization, document generation, named entity recognition (NER), speech recognition, and biological sequence analysis.

Output data processor 115 is configured to process data output from transformer module 110. For example, output data processor 115 can receive an array of data from transformer module 110 and label data. The array of data may include a numeric representation (e.g., the aggregate embedding described above) for each token in a sequence of tokens used as input to transformer module 110. The label data can include values of masked tokens and masked position values in the input data. Next, output data processor 115 identifies the numeric representations of masked tokens in the array of data and determines the predicted tokens for the masked tokens. Output data processor 115 then determines the differences between the predicted tokens for masked tokens and the actual values of the masked tokens specified in the label data. Output data processor 115 performs similar operations for masked position values. That is, output data processor 115 identifies the numeric representations of masked position values in the array of data and determines the predicted position values for the masked position values. Next, output data processor 115 determines the differences between the predicted position values for masked position values and the actual values of the masked position values specified in the label data. Finally, output data processor 115 sends the calculated differences back to transformer module 110 to adjust the weights of transformer module 110.

Figure 2:
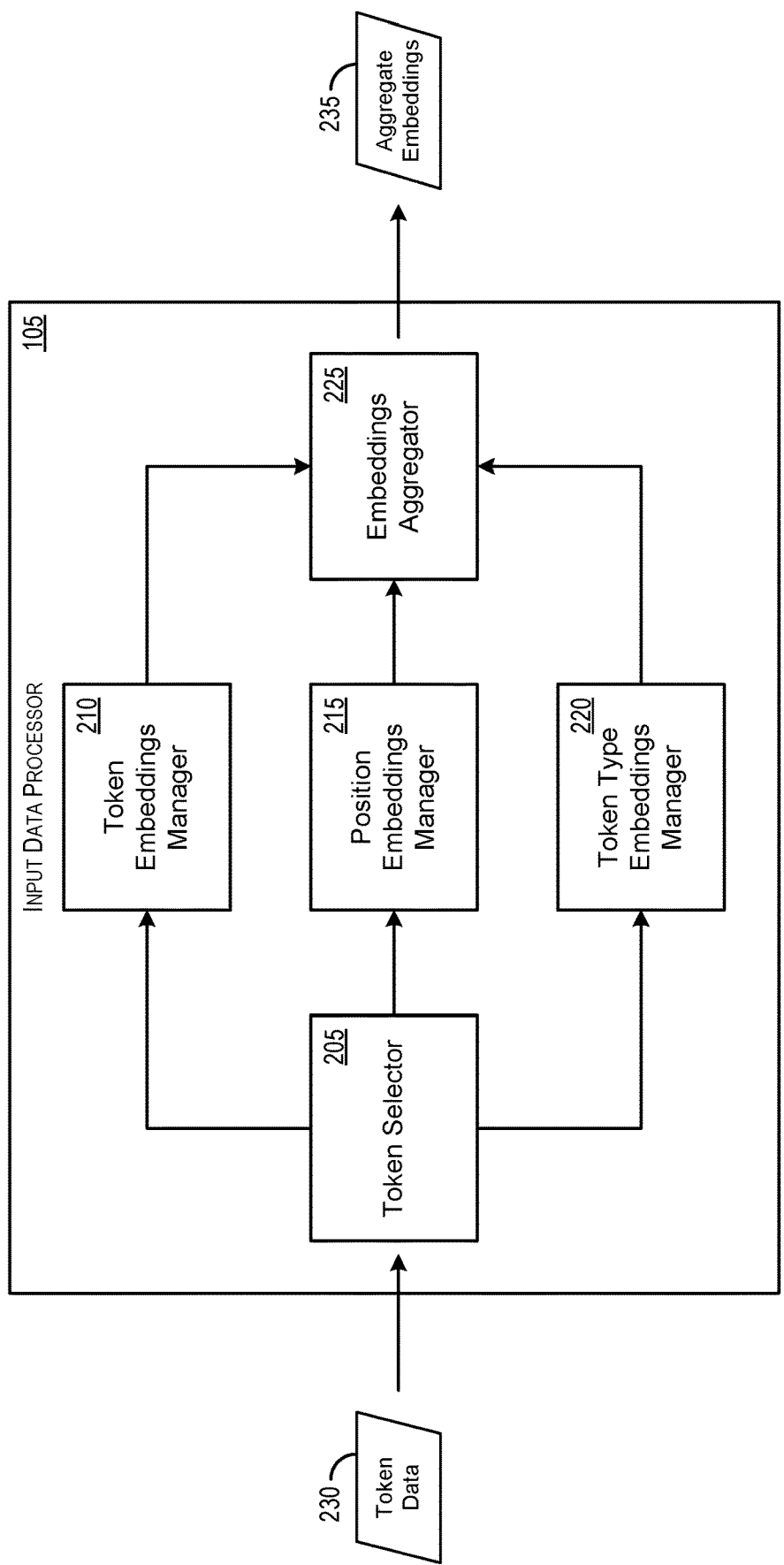
FIG. 2 illustrates an architecture of the input data processor illustrated in FIG. 1 according to some embodiments.

FIG. 2 illustrates an architecture of input data processor 105 according to some embodiments. As shown, input data processor 105 includes token selector 205, token embeddings manager 210, position embeddings manager 215, token type embeddings manager 220, and embeddings aggregator 225. Token selector 205 is configured to select tokens and position values in input data and masks them. In some embodiments, token selector 205 selects tokens and position values randomly. As illustrated in FIG. 2, token selector 205 receive token data 230 as input data. As mentioned above, the input data that input data processor 105 receives can include position values and sentence values.

FIG. 3 illustrates an example input data 300 according to some embodiments. Specifically, input data 300 is an example of token data 230. For this example, input data 300 is used to store the following two sentences: "To be or not to be. That is the question." As shown, input data 300 includes a sequence of tokens 305, a set of position values 310, and a set of sentence values 315. The sequence of tokens 305 includes special tokens STRT and SEP that each has different defined values. A STRT token may be used to indicate the beginning of input data 300. A SEP token can be used to indicate the end of a sentence.

The set of position values 310 includes a position value for each token in the sequence of tokens 305. As explained above, a position value can represent the relative position of a particular token in a sequence of tokens. In this example, position values 0-12 are used to represent the relative positions of tokens in the sequence of tokens 305. The set of sentence values 315 includes a sentence value for each token in the sequence of tokens 305. As described above, a sentence value may represent a sentence to which a token in the sequence of tokens belongs. For this example, sentence values 0 and 1 are used to represent the first and second sentences stored in input data 300.

Returning to FIG. 2, after selecting tokens to be masked, token selector 205 replaces the selected tokens with a special token that has a defined value. For the masked tokens, token selector 205 adds label data to the input data that includes the actual values of the masked tokens. FIG. 4 illustrates input data 300 with some tokens masked according to another embodiment. In this example, token selector 205 has selected the tokens "or" and "question" to be masked. Thus, as shown in FIG. 4, token selector 205 has replaced the selected tokens with a special MASK token. In addition, token selector 205 has added label data that includes the actual values of the masked tokens to input data 300. As shown, the label data for masked tokens is depicted as token labels 405.

Returning to FIG. 2, token selector 205 performs similar operations for position values in the input data. In particular, token selector 205 selects position values to be masked and then replaces the selected position values with a special token that has a defined value. For the masked position values, token selector 205 adds label data to the input data that includes the actual values of the masked position values. FIG. 5 illustrates input data 300 with some position values masked according to some embodiments. For this example, token selector 205 has selected the position values "2" and "10" to be masked. As such, token selector 205 has replaced the selected position values with a special MASK token, as illustrated in FIG. 5. Additionally, token selector 205 has added label data that includes the actual values of the masked position values to input data 300. As shown, the label data for the masked position values is depicted by position labels 505.

In some embodiments, token selector 205 may group masked tokens and masked position values together and rearrange them in the input data. For instance, token selector 205 can group the masked tokens together and rearrange them to the front of the input data. Next, token selector 205 can group the masked position values together and rearrange them towards the front of the input data and adjacent to the masked tokens. FIG. 6 illustrates input data 300 with masked data grouped and rearranged according to some embodiments. Specifically, FIG. 6 shows input data 300 with masked tokens and masked position values grouped and rearranged in the manner described above. As shown, token selector 205 has grouped the masked tokens together and rearranged them to the front of input data 300. Token selector 205 then grouped the masked position values together and rearranged them next to the masked tokens. After grouping and rearranging the input data, token selector 205 sends the input data to token embeddings manager 210, position embeddings manager 215, and token type embeddings manager 220.

Token embeddings manager 210 is responsible for determining token embeddings for tokens in input data. For example, upon receiving input data from token selector 205, token embeddings manager 210 converts each token in the input data to a numeric representation using an embedding space generated from a corpus of tokens. The numeric representation of a token can be a vector of 128, 256, 1024, 2048, 4096, etc. floating-point numbers. In some embodiments, the token embedding space is implemented as a table with entries that map tokens to their corresponding numeric representations. To determine the numeric representation of a particular token in some such embodiments, token embeddings manager 210 performs a look up on the table to find an entry that matches the token and converts the token to the numeric representation specified by the entry. Once token embeddings manager 210 determines numeric representations for each token in the input data, token embeddings manager 210 sends them to embeddings aggregator 225.

Position embeddings manager 215 is configured to determining position embeddings for position values in input data. For instance, when position embeddings manager 215 receives input data from token selector 205, position embeddings manager 215 converts each position value in the input data to a numeric representation using an embedding space generated from a corpus of position values. The numeric representation of a position value may be a vector of 128, 256, 1024, 2048, 4096, etc. floating-point numbers. In some embodiments, the position value embedding space is implemented as a table with entries that map position values to their corresponding numeric representations. To determine the numeric representation of a particular position value in some such embodiments, position embeddings manager 215 performs a look up on the table to find an entry that matches the position value and converts the position value to the numeric representation specified by the entry. After determining numeric representations for each position value in the input data, position embeddings manager 215 sends them to embeddings aggregator 225.

Token type embeddings manager 220 handles the determination of sentence embeddings for sentence values in input data. For example, once token type embeddings manager 220 receives input data from token selector 205, token type embeddings manager 220 converts each sentence value in the input data to a numeric representation using an embedding space generated from a corpus of sentence values. The numeric representation of a sentence value can be a vector of 128, 256, 1024, 2048, 4096, etc. floating-point numbers. In some embodiments, the sentence value embedding space is implemented as a table with entries that map sentence values to their corresponding numeric representations. To determine the numeric representation of a particular sentence value in some such embodiments, token type embeddings manager 220 performs a look up on the table to find an entry that matches the sentence value and converts the sentence value to the numeric representation specified by the entry. Once token type embeddings manager 220 determines numeric representations for each sentence value in the input data, token type embeddings manager 220 sends them to embeddings aggregator 225.

Embeddings aggregator 225 is configured to calculate aggregate embeddings. For example, embeddings aggregator 225 may receive token embeddings from token embeddings manager 210, position embeddings from position embeddings manager 215, and sentence embeddings from token type embeddings manager 220. Upon receiving the data from each of these components, embeddings aggregator 225 calculates an aggregate embedding for each token in the input data by adding the token embedding of the token, the position embedding associated with the token, and the sentence embedding associated with the token. Thus, the aggregate embedding for a token is a single numeric representation for the token, the position value associated with the token, and the sentence value associated with the token. Finally, embeddings aggregator 225 outputs the calculated aggregate embeddings as aggregate embeddings 235. In some embodiments, aggregate embeddings 235 is implemented in the form of an S×H array of vectors (e.g. a matrix). As such, the array may represent the sequence of tokens in input data 230 where the tokens are encoded representations of words, position values, and sentence values. For an S×H array, S can be the length (e.g., the total number of tokens) in a sequence of tokens and H can be the total number of numeric values in a vector used to represent a token. For example, if a token is represented using a vector of 1024 floating-point numbers, H is 1024.

Figure 7:
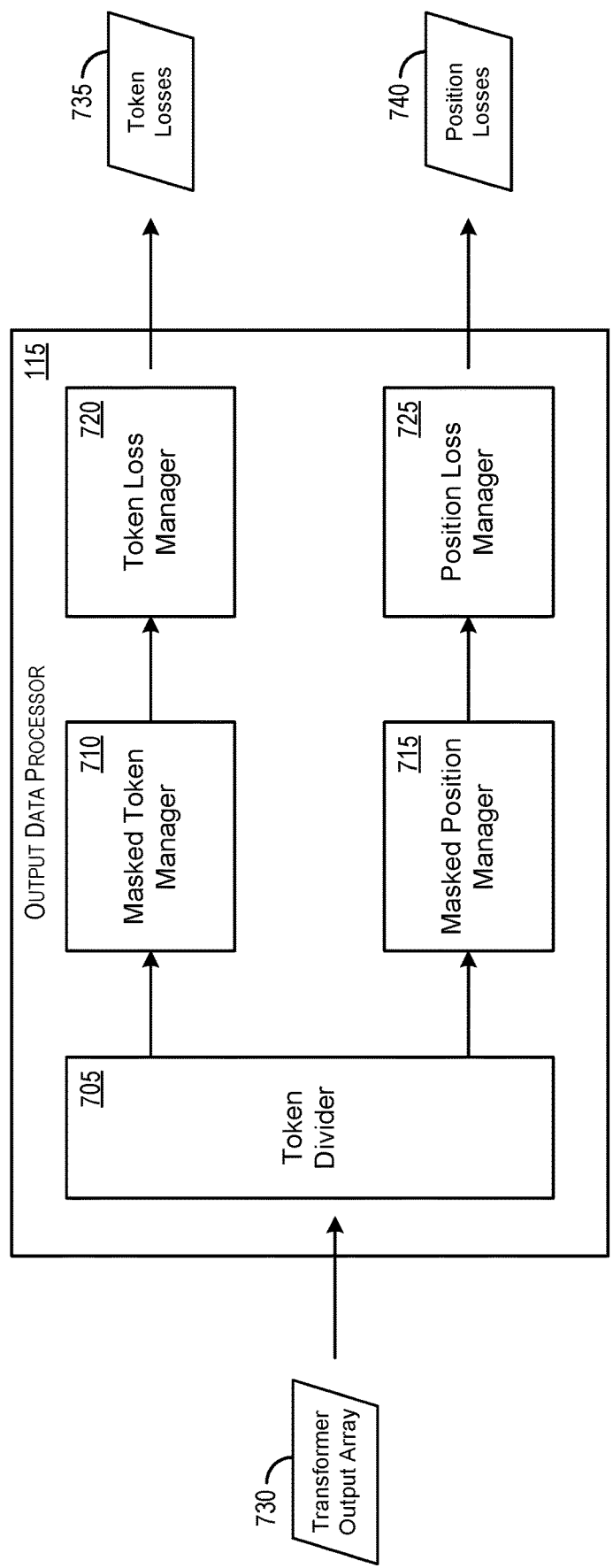
FIG. 7 illustrates an architecture of the output data processor illustrated in FIG. 1 according to some embodiments.

FIG. 7 illustrates an architecture of output data processor 115 1 according to some embodiments. As shown, output data processor 115 includes token divider 705, masked token manager 710, masked position manager 715, token loss manager 720, and position loss manager 725. Token divider 705 is responsible for dividing data based on masked tokens and masked position values. As shown in FIG. 7, token divider 705 receives transformer output array 730 as input. In some embodiments, transformer output array 730 is implemented in the form of an S×H array of vectors (e.g. a matrix) similar to the S×H array used to implement aggregate embeddings 235 described above. Token divider 705 identifies the vector representations of the masked tokens in transformer out array 730 and sends them to masked token manager 710. Also, token divider 705 identifies the vector representations of the masked position values in transformer output array 730 and sends them to masked position manager 715. In some embodiments where transformer output array 730 is implemented in the form of an S×H array, if T is the number of masked tokens, then token divider 705 sends masked token manager 710 a T×H array. If P is the number of masked position values, then token divider 705 sends masked token manager 710 a P×H array. Referring to FIG. 6 as an example, token divider 705 identifies the vector representations of the first two tokens (i.e., the tokens that are masked) and sends them as a T×H array (T=2 in this example) to masked token manager 710. Token divider 750 then identifies the vector representations of the second two tokens (i.e., the tokens with masked position values) and sends them as a P×H (P=2 in this example) to masked position manager 715.

Masked token manager 710 is configured to predict token for masked tokens. For instance, masked token manager 710 can receive from token divider 705 vector representations of masked tokens. Next, masked token manager 710 performs a set of projection functions on the vector representations to determine probabilities associated with corpus of tokens (e.g., a vocabulary of words) for each masked token. For each masked token, masked token manager 710 selects the token having the highest probability as being the token predicted for the masked token. In some embodiments where the vector representations for the masked tokens are implemented in the form of a T×H array, the set of projection functions include multiplying the T×H array by an H×V array to produce a T×V array. For the H×V array, V may be the size of a corpus of tokens and H can be the total number of numeric values in a vector used to represent each token in the corpus. The T×V array includes a vector of V values for each masked token. Each value in the vector represents a probability that a corresponding token in the corpus is the masked token. After predicting tokens for masked tokens, masked token manager 710 sends the predicted tokens to token loss manager 720.

Masked position manager 715 handles predictions of position values for masked position values. For example, masked position manager 715 may receive from token divider 705 vector representations of masked position values. Masked position manager 715 may perform a set of position functions on the vector representations to determine probabilities associated with each possible position in the sequence of tokens for each masked position value. For each masked position value, masked position manager 715 selects the position value having the highest probability as being the position value predicted for the masked position value. In some embodiments where the vector representations for the masked tokens are implemented in the form of a P×H array, the set of position functions include multiplying the P×H array by an H×S array to produce a P×S array. For the H×S array, S may be the length of the sequence of tokens and H can be the total number of numeric values in a vector used to represent each position in the sequence. The P×S array includes a vector of S values for each masked position value. Each value in the vector represents a probability that a corresponding position value in the sequence is the masked position value. Once masked position manager 715 finishes predicting position values for masked position values, masked position manager 715 sends the predicted position values to position loss manager 725.

Token loss manager 720 is responsible for determining token losses. For instance, when token loss manager 720 receives predicted tokens for masked tokens from masked token manager 710, token loss manager 720 calculates differences (e.g., errors) between the predicted tokens and the actual values of the masked tokens (e.g., stored in label data). The calculated differences is depicted in FIG. 7 as token losses 735. Token loss manager 720 may send token losses 735 to transformer module 110, which transformer module 110 uses to adjust its weights.

Position loss manager 725 is configured to determine position value losses. For example, upon receiving predicted position values for masked position values from masked position manager 715, position loss manager 725 may calculate differences (e.g., errors) between the predicted position values and the actual position values of the masked position values (e.g., stored in label data). The calculated differences is depicted in FIG. 7 as position losses 740. Position loss manager 725 can send position losses 740 to transformer module 110, which transformer module 110 uses to adjust its weights.

Figure 8:
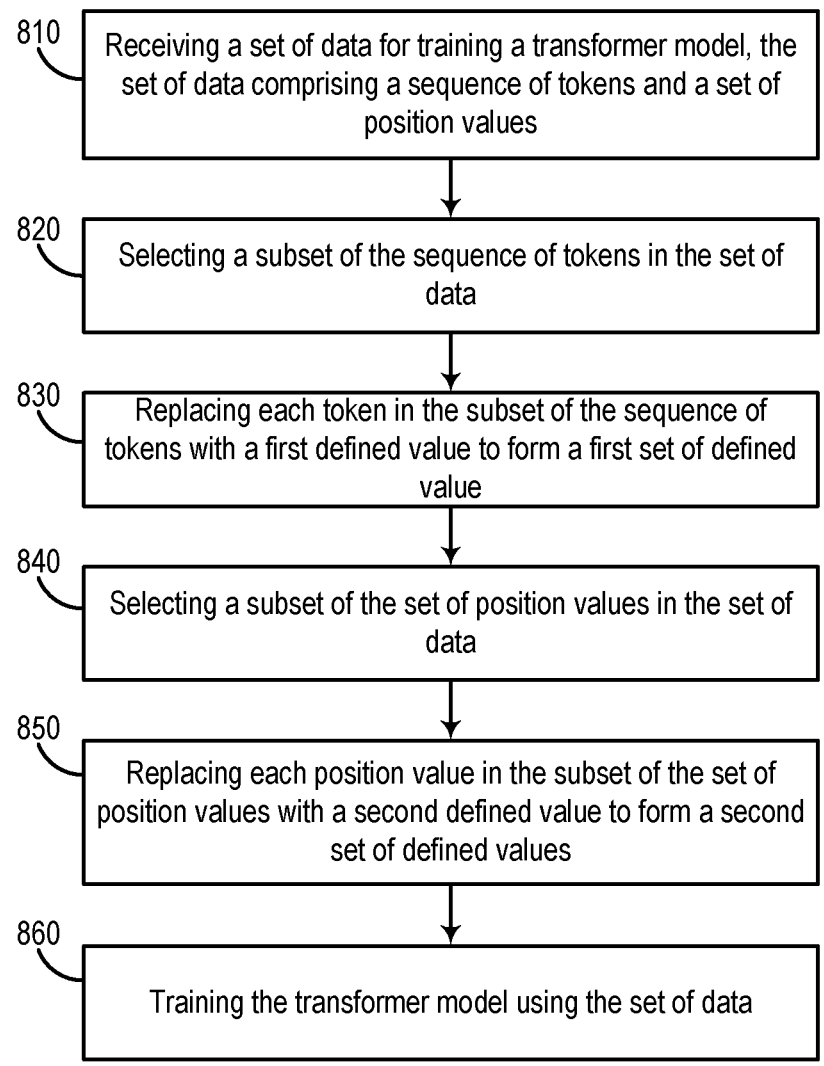
FIG. 8 illustrates a process for generating training data with masked position values according to some embodiments.

FIG. 8 illustrates a process 800 for generating training data with masked position values according to some embodiments. In some embodiments, system 100 performs process 800. Process 800 begins by receiving, at 810, a set of data for training a transformer model, the set of data comprising a sequence of tokens and a set of position values. Each position value in the set of position values represents a position of a token in the sequence of tokens relative to other tokens in the sequence of tokens.

Next, process 800 selects, at 820, a subset of the sequence of tokens in the set of data. Process 800 then replaces, at 830, each token in the subset of the sequence of tokens with a first defined value to form a first set of defined value. At 840, process 800 selects a subset of the set of position values in the set of data. Then, process 800 replaces, at 850, each position value in the subset of the set of position values with a second defined value to form a second set of defined values. Finally, process 800 trains, at 860, the transformer model using the set of data.

Figure 9:
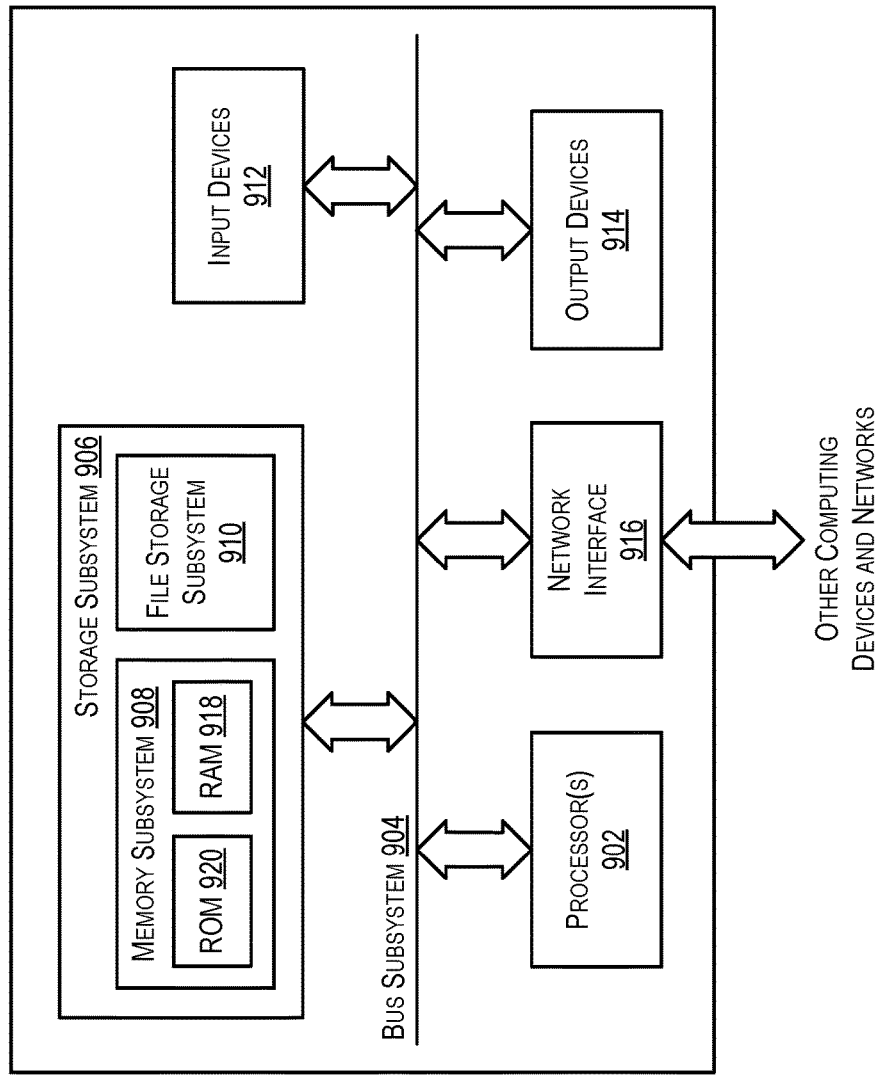
FIG. 9 depicts a simplified block diagram of an example computer system according to some embodiments.

The techniques describe above may be implemented in a wide range of computer systems configured to process neural networks. FIG. 9 depicts a simplified block diagram of an example computer system 900, which can be used to implement the techniques described in the foregoing disclosure. In some embodiments, computer system 900 may be used to implement system 100. As shown in FIG. 9, computer system 900 includes one or more processors 902 that communicate with a number of peripheral devices via a bus subsystem 904. These peripheral devices may include a storage subsystem 906 (e.g., comprising a memory subsystem 908 and a file storage subsystem 910) and a network interface subsystem 916. Some computer systems may further include user interface input devices 912 and/or user interface output devices 914.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., Ethernet, a Wi-Fi and/or cellular adapter, a modem (telephone, satellite, cable, ISDN, etc.), digital subscriber line (DSL) units, and/or the like.

Storage subsystem 906 includes a memory subsystem 908 and a file/disk storage subsystem 910. Subsystems 908 and 910 as well as other memories described herein are examples of non-transitory computer-readable storage media that can store executable program code and/or data that provide the functionality of embodiments of the present disclosure.

Memory subsystem 908 includes a number of memories including a main random access memory (RAM) 918 for storage of instructions and data during program execution and a read-only memory (ROM) 920 in which fixed instructions are stored. File storage subsystem 910 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

Figure 10:
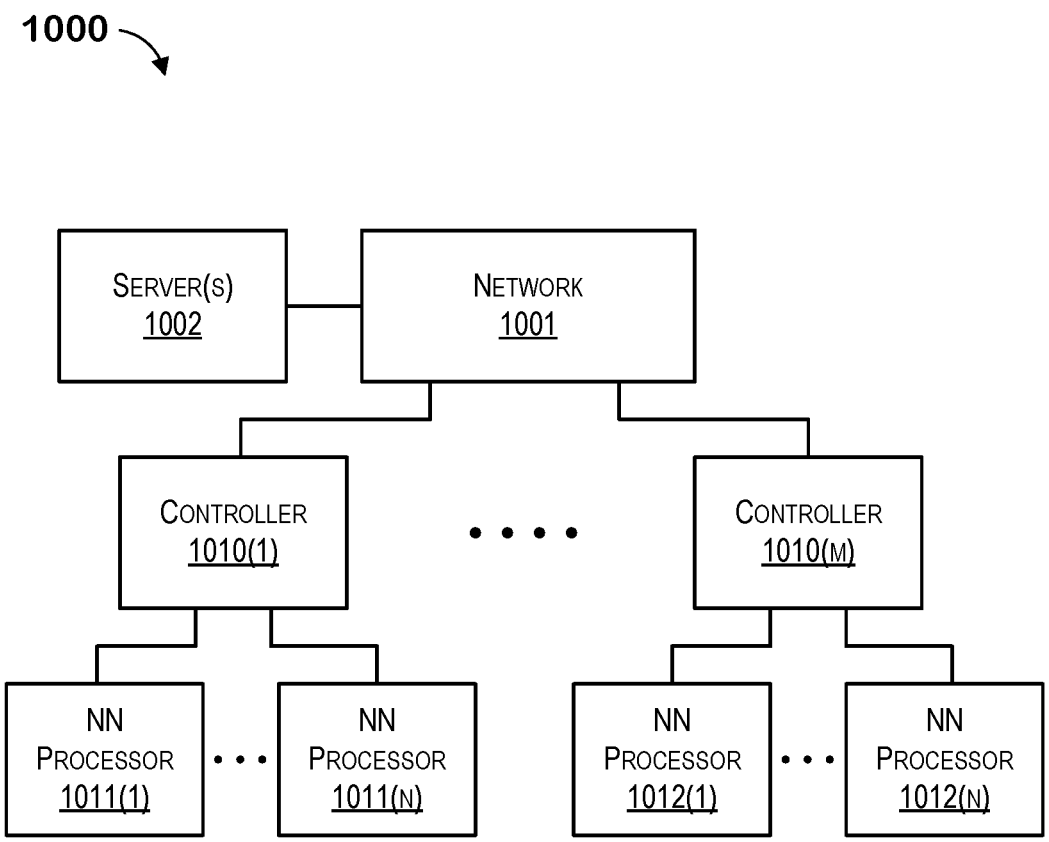
FIG. 10 illustrates a neural network processing system according to some embodiments.

FIG. 10 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1002, which may comprise architectures illustrated in FIG. 9 above, may be coupled to a plurality of controllers 1010(1)-1010(M) over a communication network 1001 (e.g. switches, routers, etc.). Controllers 1010(1)-1010(M) may also comprise architectures illustrated in FIG. 9 above. Each controller 1010(1)-1010(M) may be coupled to one or more NN processors, such as processors 1011(1)-1011(N) and 1012(1)-1012(N), for example. NN processors 1011(1)-1011(N) and 1012(1)-1012(N) may include a variety of configurations of functional processing blocks and memory optimized for neural network processing, such as training or inference. The NN processors are optimized for neural network computations. Server 1002 may configure controllers 1010 with NN models as well as input data to the models, which may be loaded and executed by NN processors 1011(1)-1011(N) and 1012(1)-1012(N) in parallel, for example. Models may include layers and associated weights as described above, for example. NN processors may load the models and apply the inputs to produce output results. NN processors may also implement training algorithms described herein, for example.

Further Example Embodiments

In various embodiments, the present disclosure includes systems, methods, and apparatuses for training transformer models using position masking. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a system comprising a set of processing units and a non-transitory machine-readable medium storing instructions that when executed by at least one processing unit in the set of processing units cause the at least one processing unit to receive a set of data for training a transformer model, the set of data comprising a sequence of tokens and a set of position values, wherein each position value in the set of position values represents a position of a token in the sequence of tokens relative to other tokens in the sequence of tokens; select a subset of the sequence of tokens in the set of data; replace each token in the subset of the sequence of tokens with a first defined value to form a first set of defined value; select a subset of the set of position values in the set of data; replace each position value in the subset of the set of position values with a second defined value to form a second set of defined values; and train the transformer model using the set of data.

In one embodiment, training the transformer model comprises determining a token embedding for each token in the sequence of tokens; and determining a position embedding for each position value in the set of position values.

In one embodiment, the set of data further comprises a set of sentence values, where each sentence value in the set of sentence values represents a sentence to which a token in the sequence of tokens belongs, wherein training the transformer model comprises determining a sentence embedding for each sentence value in the set of sentence values; and for each token in the sequence of tokens, adding together the token embedding associated with the token, the position embedding associated with the token, and the sentence embedding associated with the token to form an aggregate embedding for the token.

In one embodiment, the present disclosure adds a set of labels to the set of data, wherein each label in the set of labels comprises a position value in the subset of position values replaced by the second defined value.

In one embodiment, training the transformer model further comprises, based on the set of aggregate embeddings, predicting a position value for each defined value in the second set of defined values; determining differences between the position values predicted for the second set of defined values and the set of labels; and adjusting weight values of the transformer model based on the differences.

In one embodiment, the present disclosure groups the subset of the sequence of tokens and the position values associated with the subsequence of tokens together and rearranges the grouped subset of the sequence of tokens and the position values associated with the subsequence of tokens within the set of data.

In one embodiment, the present disclosure groups the subset of position values and the tokens associated with the subset of position values together and rearranges the grouped subset of position values and the tokens associated with the subset of position values within the set of data.

In one embodiment, a number of tokens in the subsequence of tokens is a first defined percentage of a number tokens in the sequence of tokens, wherein a number of position values in the subset of position values is a second defined percentage of a number of position values in the set of position values.

In one embodiment, the first defined percentage is different than the second defined percentage.

In one embodiment, training the transformer model further comprises generating a P×H matrix of probabilities, wherein M is a total number of masked positions, H is a total number of tokens in the sequence of tokens, and an (Pi,Hj) element in the P×H matrix stores a probability of a masked position i being in a position j in the sequence.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:
a set of processing units; and
a non-transitory machine-readable medium storing instructions that when executed by at least one processing unit in the set of processing units cause the at least one processing unit to:
receive a set of data for training a transformer model, the set of data comprising a sequence of tokens and a set of position values, wherein each position value in the set of position values represents a position of a token in the sequence of tokens relative to other tokens in the sequence of tokens;
select a subset of the sequence of tokens in the set of data;
replace each token in the subset of the sequence of tokens with a same first defined value to form a modified version of the sequence of tokens comprising a set of same first defined values;
select a subset of the set of position values in the set of data;
replace each position value in the subset of the set of position values with a same second defined value to form a modified version of the set of position values comprising a set of same second defined values, wherein the same second defined value represents a masked position value that is used when training the transformer model; and
train the transformer model using the set of data that comprises the modified version of the sequence of tokens and the modified version of the set of position values.

2. The system of claim 1, wherein training the transformer model comprises:
determining a token embedding for each token in the modified version of the sequence of tokens; and
determining a position embedding for each position value in the modified version of the set of position values.

3. The system of claim 2, wherein the set of data further comprises a set of sentence values, where each sentence value in the set of sentence values represents a sentence to which a token in the modified version of the sequence of tokens belongs, wherein training the transformer model comprises:
determining a sentence embedding for each sentence value in the set of sentence values; and
for each token in the modified version of the sequence of tokens, adding together the token embedding associated with the token, the position embedding associated with the token, and the sentence embedding associated with the token to form an aggregate embedding for the token.

4. The system of claim 3, wherein the instructions further cause the at least one processing unit to add a set of labels to the set of data, wherein each label in the set of labels comprises a position value in the subset of position values replaced by the second defined value.

5. The system of claim 4, wherein training the transformer model further comprises:
based on the set of aggregate embeddings, predicting a position value for each second defined value in the set of same second defined values;
determining differences between the position values predicted for the set of same second defined values and the set of labels; and
adjusting weight values of the transformer model based on the differences.

6. The system of claim 1, wherein the instructions further cause the at least one processing unit to:
group the subset of the sequence of tokens and the position values associated with the subsequence of tokens together; and
rearrange the grouped subset of the sequence of tokens and the position values associated with the subsequence of tokens within the set of data.

7. The system of claim 6, wherein the instructions further cause the at least one processing unit to:
group the subset of position values and the tokens associated with the subset of position values together; and
rearrange the grouped subset of position values and the tokens associated with the subset of position values within the set of data.

8. The system of claim 1, wherein a number of tokens in the subsequence of tokens is a first defined percentage of a number tokens in the sequence of tokens, wherein a number of position values in the subset of position values is a second defined percentage of a number of position values in the set of position values.

9. The system of claim 1, wherein the subset of the set of position values in the set of data are selected randomly.

10. The system of claim 1, wherein training the transformer model comprises, for each same second defined value in the set of same second defined values:
using the transformer model to predict a particular position value;
determining a difference between the predicted particular position value and an original position value; and
adjusting weights of the transformer model based on the difference.

11. A method comprising:
receive a set of data for training a transformer model, the set of data comprising a sequence of tokens and a set of position values, wherein each position value in the set of position values represents a position of a token in the sequence of tokens relative to other tokens in the sequence of tokens;

selecting a subset of the sequence of tokens in the set of data;

replacing each token in the subset of the sequence of tokens with a same first defined value to form a modified version of the sequence of tokens comprising a set of same first defined values;

selecting a subset of the set of position values in the set of data;

replacing each position value in the subset of the set of position values with a same second defined value to form a modified version of the set of position values comprising a set of same second defined values, wherein the same second defined value represents a masked position value that is used when training the transformer model; and training the transformer model using the set of data that comprises the modified version of the sequence of tokens and the modified version of the set of position values.

12. The method of claim 11, wherein training the transformer model comprises:
determining a token embedding for each token in the modified version of the sequence of tokens; and
determining a position embedding for each position value in the modified version of the set of position values.

13. The method of claim 12, wherein the set of data further comprises a set of sentence values, where each sentence value in the set of sentence values represents a sentence to which a token in the modified version of the sequence of tokens belongs, wherein training the transformer model comprises:
determining a sentence embedding for each sentence value in the set of sentence values; and
for each token in the modified version of the sequence of tokens, adding together the token embedding associated with the token, the position embedding associated with the token, and the sentence embedding associated with the token to form an aggregate embedding for the token.

14. The method of claim 13, wherein the instructions further cause the at least one processing unit to add a set of labels to the set of data, wherein each label in the set of labels comprises a position value in the subset of position values replaced by the second defined value.

15. The method of claim 14, wherein training the transformer model further comprises:
based on the set of aggregate embeddings, predicting a position value for each second defined value in the set of same second defined values;
determining differences between the position values predicted for the set of same second defined values and the set of labels; and
adjusting weight values of the transformer model based on the differences.

16. The method of claim 11 further comprising:
grouping the subset of the sequence of tokens and the position values associated with the subsequence of tokens together; and
rearranging the grouped subset of the sequence of tokens and the position values associated with the subsequence of tokens within the set of data.

17. The method of claim 16 further comprising:
grouping the subset of position values and the tokens associated with the subset of position values together; and
rearranging the grouped subset of position values and the tokens associated with the subset of position values within the set of data.

18. The method of claim 11, wherein a number of tokens in the subsequence of tokens is a first defined percentage of a number tokens in the sequence of tokens, wherein a number of position values in the subset of position values is a second defined percentage of a number of position values in the set of position values, wherein the first defined percentage is different than the second defined percentage.

19. The method of claim 11, wherein training the transformer model comprises, for each same second defined value in the set of same second defined values:
using the transformer model to predict a particular position value;
determining a difference between the predicted particular position value and an original position value; and
adjusting weights of the transformer model based on the difference.

20. A non-transitory machine-readable medium storing a program executable by at least one processing unit of a computer system, the program comprising sets of instructions for:
receive a set of data for training a transformer model, the set of data comprising a sequence of tokens and a set of position values, wherein each position value in the set of position values represents a position of a token in the sequence of tokens relative to other tokens in the sequence of tokens;
selecting a subset of the sequence of tokens in the set of data;
replacing each token in the subset of the sequence of tokens with a same first defined value to form a modified version of the sequence of tokens comprising a set of same first defined values;
selecting a subset of the set of position values in the set of data;
replacing each position value in the subset of the set of position values with a same second defined value to form a modified version of the set of position values comprising a set of same second defined values, wherein the same second defined value represents a masked position value that is used when training the transformer model; and
training the transformer model using the set of data that comprises the modified version of the sequence of tokens and the modified version of the set of position values.

* * * * *